Patented May 6, 1930

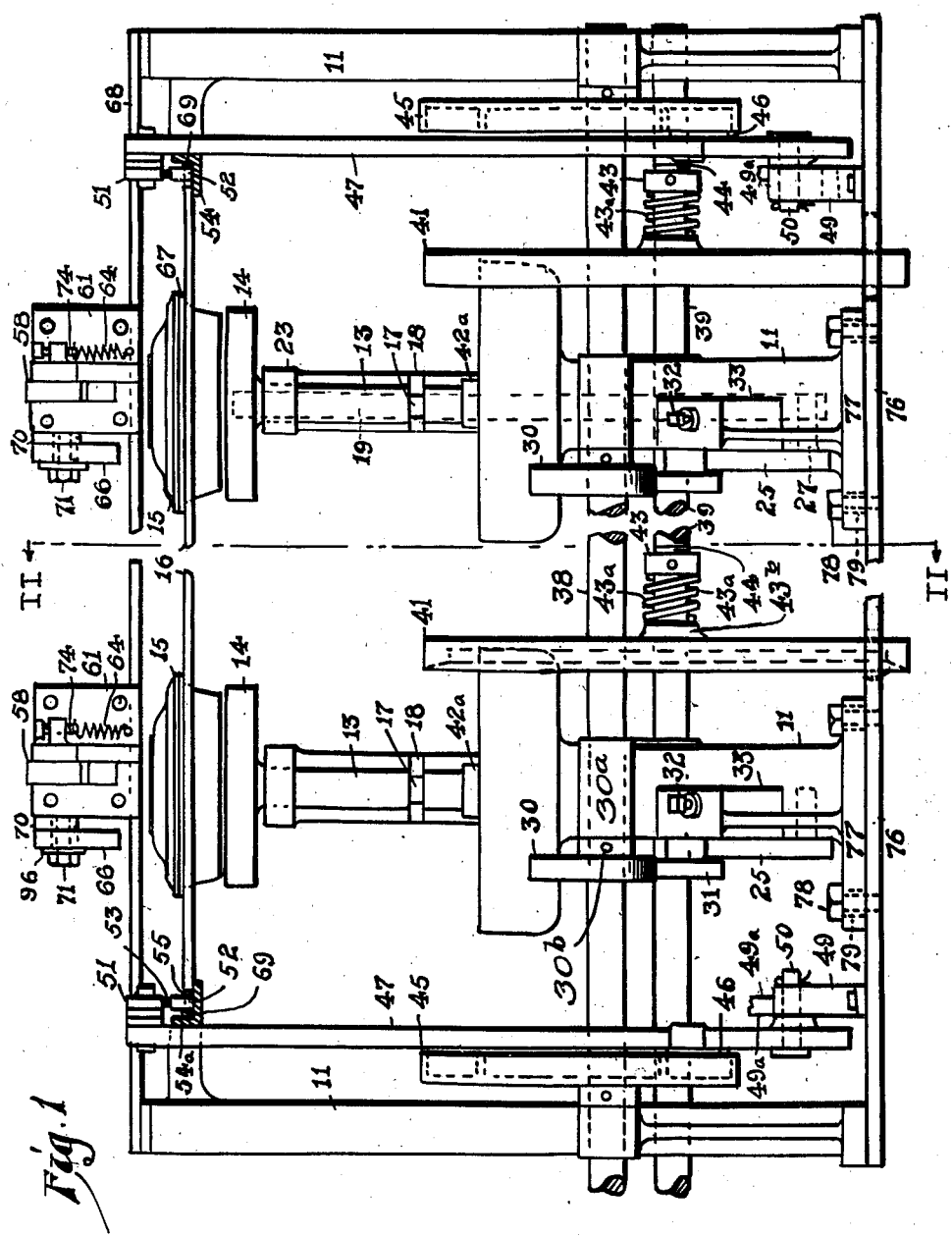

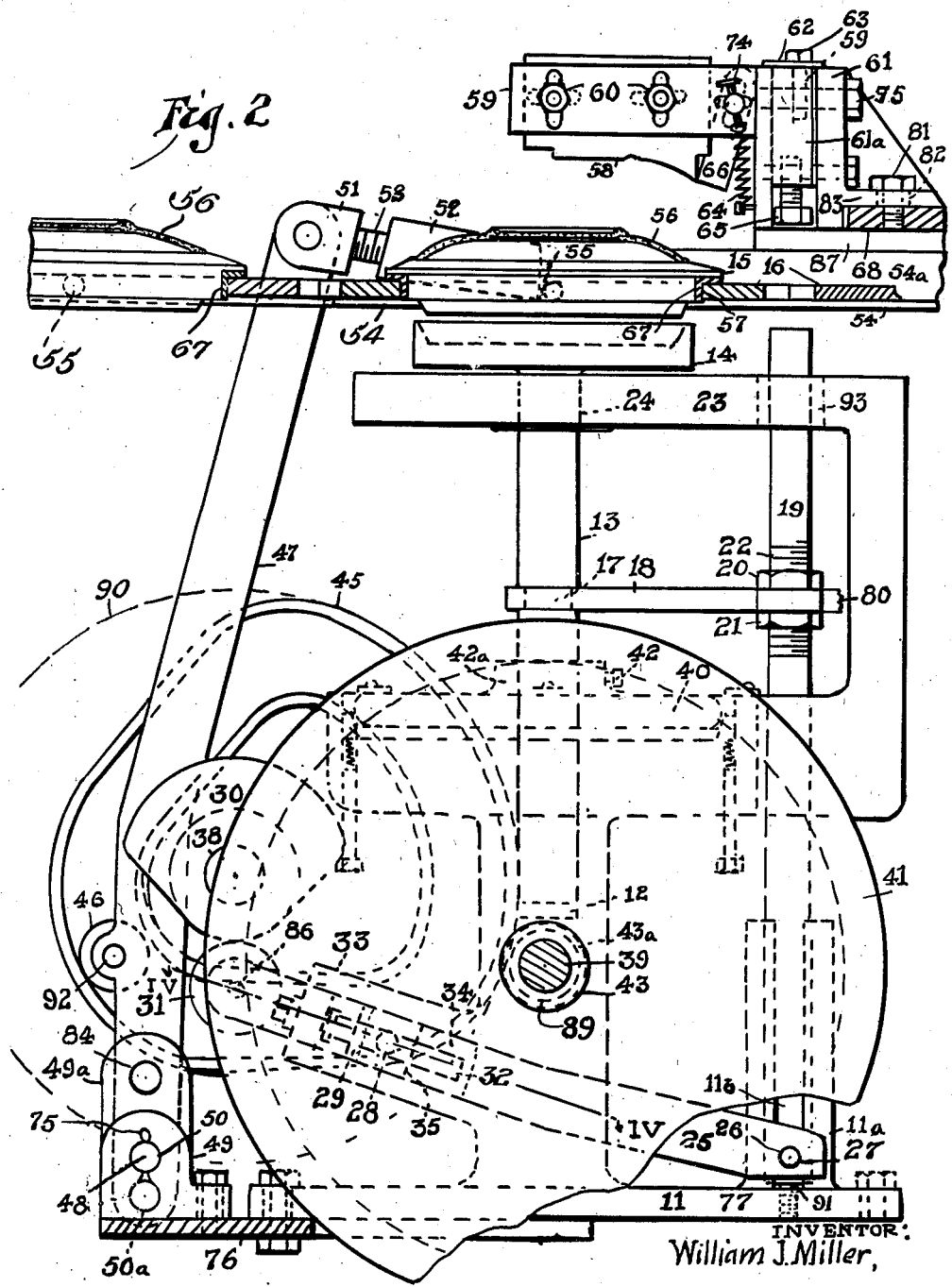

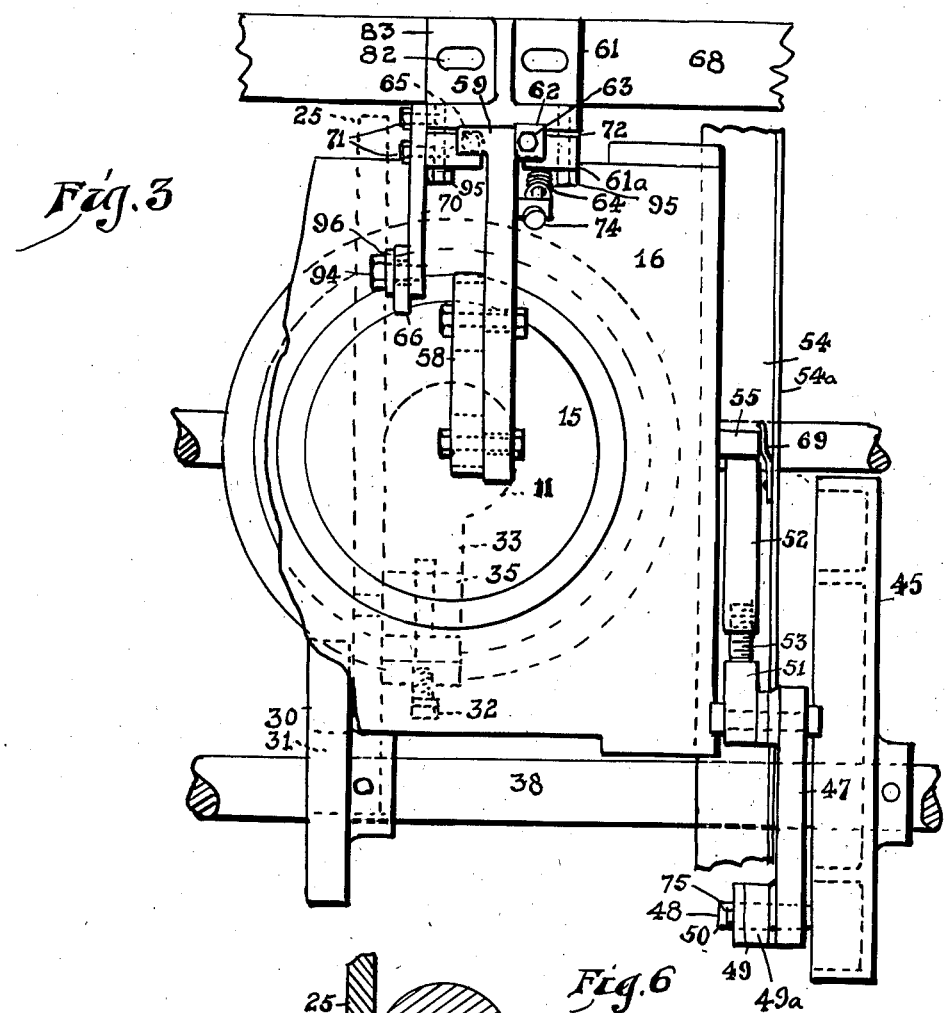

1,757,132

UNITED STATES PATENT OFFICE

WILLIAM J. MILLER, OF SWISSVALE, PENNSYLVANIA

MACHINE FOR USE IN THE MANUFACTURE OF POTTERY WARE

Application filed November 17, 1926. Serial No. 148,872.

My invention relates to improvements in machine for use in the manufacture of pottery ware, and is an improvement on the mechanism described in my copending application for patent for jiggers for use in the manufacture of articles from plastic materials, Serial No. 143,994, filed October 25, 1926; it consists in the novel features hereinafter more fully described.

The principal object of the present invention is to provide an improved type of mold conveying and actuating mechanism particularly adapted for use in the manufacture of pottery ware.

More specifically, the present invention relates to a machine particularly adapted for use in the manufacturing of pottery ware wherein a multiple of molds may be advanced simultaneously rectilinearly into position over reciprocating chucks or jiggering mechanism which act to move the molds vertically into operative position relatively to shaping or analogous fabricating tools.

The machine also embodies an improved type of jiggering mechanism and means for adjusting certain of the working parts while in operation and while the driving connection subsists.

Numerous other objects and advantages will become apparent in view of the following description and accompanying drawings.

I attain these objects by the mechanism, one form of which is illustrated in the accompanying drawings, or by any mechanical equivalent or obvious modification of the same.

In the drawings Fig. 1 is a front elevation of my machine, shown as broken away at the middle part thereof.

Fig. 2 is a section on a larger scale than Fig. 1 on the line II—II of Fig. 1.

Fig. 3 is a plan view of one of the units of my machine, which is shown at the right hand end of Fig. 1.

Fig. 4 is a detail in section on the line IV—IV of Fig. 2, showing the slotted lever, which is hereinafter described, and parts adjacent thereto.

Fig. 5 is a detail side view of said slotted lever and bracket adjacent thereto, looking from left to right in Fig. 4, showing the alignment of the slots therein.

Fig. 6 is a plan view on a reduced scale of a modification of my machine, which is hereinafter described.

Like numerals refer to like parts throughout the several views.

11 designates the frame of each jigger unit of the machine; the frames 11 have therein supports or pivot bearings 12 for multiple spindles 13, which terminate in chucks 14, to carry molds 15, which are shown in Figs. 1 and 2 as supported in position on one of a line of carriers or trays 16, when said spindles 13 are in their lowest position.

Each of the frames 11 terminates at its lower end in a floor plate or flange 77, which is shown as adjustably connected to a base plate 76 by means of screws 79, which pass through enlarged openings 79 in the flanges 77, which openings allow the horizontal adjustment of said flanges 77 on said base plate 76.

The spindles 13 have each therein a neck 17, to fit a fork 18, which may be adjustably secured to a parallel or substantially parallel member or pitman 19 by means of nuts 20 and 21 on a threaded portion 22 on said pitman 19. The frames 11 have each thereon housings 11ª for the lower ends of the pitmen 19 to slide therein, slots 11ᵇ are provided in said housings 11ª for pins 27 on said pitmen 19 to extend therethrough.

Brackets 23, which form extensions of the frame 11, have therein sockets 24, for the upper parts of said spindles 13 to slide therethrough, and openings 93, for the upper parts of the pitmen 19 to slide therethrough.

The forks 18 serve to raise and lower the spindles 13, and they are moved by the pitmen 19, which are in turn reciprocated by means of slotted levers 25, provided with holes at their ends 26, for receiving said pins 27 at the lower ends of the pitmen 19; the levers 25 are pivoted at 28 on floating blocks 29, which are hereinafter described. The lowest position of the pitmen 19 may be varied and adjusted by means of screws 91 thereunder in the frame 11.

The forks 18 are shown in Fig. 2 as broken off at 80, to indicate that in larger machines each fork 18 may be extended rearwardly, to operate more than one spindle 13, if desired; the multiple forks 18, shown in Fig. 1, may also be connected and actuated by a single pitman 19, if desired.

The levers 25 are actuated by revolving cams 30 acting on rolls 31, which are pivotally connected to the other ends of said levers 25 by means of pins 86.

The stroke of the pitmen 19 may be varied while in operation by shifting the blocks 29 lengthwise the slots 37 in said levers 25 by means of adjusting screws 32 acting on duplicate blocks 35; the screws 32 are supported by slotted brackets 33 on the frame 11; the brackets 33 have therein slots 34, to fit the duplicate blocks 35, which are pivotally connected to said blocks 29 at 28, and have embodied therein interior threads 36 in engagement with said screws 32, which are held against longitudinal displacement by means of collars 73 thereon, as shown in Fig. 4.

The blocks 29 may be guided lengthwise of the levers 25 by means of the slots 37, formed in the latter, and flanges 85 on said blocks 29.

The slots 34 in the brackets 33 are situated in planes parallel to the levers 25 and opposite the slots 37 in said levers 25, and the slots 34 are so disposed with relation to the slots 37, that when the pitmen 19 are in their lowest position, the shifting of the blocks 29 in the slots 37 may take place simultaneously with the shifting of the blocks 35 in said slots 34, without changing the lowest position of the levers 25 and the pitmen 19.

One block may be substituted for the two blocks for each bracket 33 and lever 25, if desired; this one block having to have thereon a part, which is slidably connected to the bracket 33 in the slot 34, and another part, which is both slidably and pivotally connected to said lever 25 in the slot 37, to allow the oscillation and sliding of the lever 25 on said block.

The cams 30 are adjustably mounted on a shaft 38, by means of hubs 30$^a$ and screws 30$^b$ as shown in Fig. 1. The shaft 38 may be operatively connected to a power shaft 39 by means of spur gears 89 and 90, which are indicated by their pitch circles in Fig. 2, which shows a diagrammatic illustration of the power transmission; a train of gears may preferably be employed instead of one pair of spur gears.

An independent motor or power shaft may also preferably be provided for and operatively connected to the shaft 38 with the cams 30 thereon, whereby the speed thereof may be independent of the speed of said power shaft 39 and the parts actuated thereby.

The cams 30 are diagrammatically shown in Fig. 2, and they are designed properly to time the simultaneous reciprocating motion of the spindles 13, which have each mounted thereon a friction gear 40, shown in dotted lines in Fig. 2, intermittently to be engaged by a continuous motion gear 41 on said power shaft 39. The cams 30 may be adjusted on the shaft 38 to operate the spindles 13 either in unison or each spindle independently of the phase of motion of the other spindles.

The outline of the cams 30 may be designed to give a rapid initial velocity to the spindles 13 at the beginning of the stroke thereof, a retarded motion near the end of their stroke and a period of dwell in the operative position of the molds 15 at the end of the stroke of said spindles 13.

The gears 40 may be adjustably secured to the spindles 13 by means of hubs 42$^a$ thereon and screws 42, and the other details of construction of said gears 40 and 41 may be substantially as described in my aforesaid copending application.

43 are nuts on the shaft 39, to adjust the pressure of springs 43$^a$ on hubs 43$^b$ on the gears 41 on the shaft 39, and 44 are threaded portions of said shaft 39 in engagement with said nuts 43.

The rolls 31 are kept in contact with the cams 30 by means of the gravity of the sundry parts, which are lifted thereby; but suitable springs may be added for this purpose, if desired.

The shaft 38 has also mounted thereon positive cams 45, in contact with rolls 46, which are pivotally connected by means of pins 92 to arms 47, to oscillate the latter on pins or pivots 48, which are mounted in supports 49 on the base plate 76, which have therein bearings 50, said arms 47 have therein multiple openings 50$^a$, for the pins or pivots 48 to be journalled therein, thereby varying the acting length of said arms 47. The position of the pins 92 on said arms 47 may be different than as shown in Fig. 2 of the drawings, if desired.

An extension 49$^a$ on each of the supports 49 has therein an opening 84 opposite a corresponding opening 50$^a$ in each of the arms 47, for the pin 48 to be placed therein when it is desired to oscillate the arms 47 through about twice as large an angle as they would with the pin 48 in the opening 50 of said supports 49, in the position as shown in Fig. 1, to double the amplitude of the carriers 16, for a purpose, which is hereinafter described.

The pin holes 50$^a$ in the lever 47 and the openings 50 and 84 in the supports 49—49$^a$ are so disposed with relation to each other that the pins 48 could be replaced or changed therein from one position to another without affecting the position of the carriers 16 and without necessitating any change in the position of the cams 45.

A split pin 75 is shown in Fig. 2 as connected to the end of the pin 48, to prevent longitudinal displacement of the latter.

Links 51 are shown as pivotally connected to the upper ends of the arms 47, and have adjustably connected thereto latches 52 by means of screw threads 53. The latches 52 with the links 51 and threads 53 form extensible pawls.

The carriers 16 are shown as slidably mounted on tracks 54, along which they may be moved by the extensible pawls 51 and 52, which engage pins or projections 55 at the sides of the successive carriers 16; when the operation of profiling the material 56 on the molds 15 on a carrier 16 is completed, the carrier 16 is moved rearwardly by another and similar carrier 16 with molds thereon, which is moved by said pawls 51 and 52 and placed in position over the chucks 14 of the spindles 13, with material 56 thereon, to be profiled.

The tracks 54 are shown as having thereon a flange 54ª, and they also serve as slidable stops for said extensible pawls 51—52, to limit the downward motion of the same.

The tracks 54 also serve for moving the carriers 16 with the molds 15 thereon to any required destination, after the operation of profiling of the material on said molds is completed.

The cams 45 are designed to gradually accelerate the speed of the carriers 16 after starting to move them by means of the pawls 51—52 and gradually retard them before discontinuing to act thereon, thereby gradually bringing the said carriers to a state of rest with the molds 15 over the chucks 14. Plate springs 69 are also provided, as shown in Fig. 3, to engage the ends of the pins 55 of the carriers 16 when the latter are in operative position, to prevent the displacement of the same on the tracks 54 rearwardly by momentum; the springs 69 are connected to the flanges 54ª of the tracks 54, and they are shown in Fig. 3 as having their ends bent inwardly at a suitable angle to aid in keeping the carriers 16 in place when the latter are in operative position and are not acted on by the pawls 51—52, without interfering with the action of the latter in moving the carriers 16 along the track 54.

Openings 57 with bushings 67 therein are provided in the carriers 16, for molds 15 to be placed therein; the bushings 67 serve to allow molds of different sizes to be placed on the same carriers. The openings 57 with the bushings 67 serve as seats for the molds 15; other forms of seats may be used if desired.

The carriers 16 are shown in Figs. 1 and 2 as carrying thereon each multiple molds, placed in parallel or in a direction transversely to the direction of motion of said carriers 16; but the carriers 16 may also be designed to carry each multiple molds placed in series or in a direction parallel to the direction of motion thereof and the machine designed to operate said molds simultaneously.

The machine may also be designed to operate simultaneously on multiple molds, placed both in parallel and in series, as is diagrammatically illustrated in Fig. 6, where two carriers are shown as employed for one simultaneous operation of the machine.

As many jiggers may be served by the same carrier as there are molds on it, and more than one carrier may be operated simultaneously in large machines. The amplitude of the arms 47 can be readily doubled for operating multiple molds, as arranged in Fig. 6, as is hereinbefore described, by changing the pin connection from the pin hole 50 in the bearing 49 to the pin hole 84 in the extension bearing 49ª, whereby the carriers 16 may be moved over two jiggers at the same time.

The molds 15 are periodically raised by the chucks 14 and brought into coaction with profiles 58, which are shown as adjustably secured to sliding members 59 by means of suitable fastenings 60. The profiles 58 may be adjusted in position on said members 59 by means of horizontal slots in the latter and vertical slots in said profiles, as shown in Fig. 2.

The sliding members 59 are shown as suspended by means of adjustable screws 63 and pended by means of adjustable screws 63 and plates 62 from brackets 61 and gibs or guides 61ª, which are hereinafter described; the plates 62 act as stops for said members 59, and are adjustably connected to said members 59 by means of said screws 63, for varying and adjusting the lowest position of said members 59.

The brackets 61 may be secured to platforms 68 by means of screws 81 passing through enlarged bolt holes 82 therein which allow horizontal adjustment of the brackets 61 on the platforms 68, which are mounted on the frame 11 and spaced therefrom by filler blocks 87, which may be interchanged to adjust the vertical position of the brackets 61.

A trimmer 66 is shown as secured by means of a screw 94 and a washer 96 to a holder 70, which is secured to each of the brackets 61 and to one of a pair of gibs 61ª on the brackets 61, which are hereinafter described, by means of screws 71, as shown in Fig. 3; the trimmer 66 serves to trim the rims of the material 56 on the molds 15, as the latter are being raised after the profiling operation is completed at the end of the upward stroke of the chuck 14.

Horizontal and vertical slots are provided in the trimmers 66, and holder 70 respectively, for adjusting the position of the former with relation to that of the profiles 58.

A pair of gibs 61ª are shown in Fig. 3 as adjustably secured to each of the brackets 61 by means of screws 95, to guide the member 59 therebetween.

The gibs 61ª are adjustably spaced from the brackets 61 by means of shims or filler plates 72, to take up the wear on the member 59.

Adjustable tensile springs 64 are shown as connected at their upper ends to screws 74 on the sliding members 59 and at the lower ends thereof to the gibs 61ª, to assist in bringing down said members 59 each time after the latter are raised by the upper ends of the pitmen 19; the pitmen 19 are designed to strike the heads of adjusting screws 65, which are connected to the underside of the members 59, after the molds 15 with the material 56 thereon are brought by the chucks 14 into the proper position for the operation of profiling, which is completed before the profiles 58 are raised by the action of said pitmen 19 on the screws 65; the action of the trimmer 66 then starts, and it continues as the molds 15 and profiles 58 continue both to move upwardly, to allow the trimmers 66 to act on the rim of the material 56, until the operation of trimming is completed, when the chucks 14 and pitmen 19 recede; the sliding blocks 59 with the profiles 58 thereon are then brought down by the tension springs 64, with the plates 62 resting on the brackets 61 and gibs 61ª; the molds 15 are shortly thereafter intercepted by a carrier 16, which is moved away along the tracks 54, as is hereinbefore described.

The screws 74 serve to adjust the tension of the springs 64.

The adjustable extension springs 64 also serve to limit the pressure between the material 56 on the molds 15 and the profiles 58, and make the contact therebetween resilient, where the profiles 58 or any of them may yield when encountering hard parts of the material 56 or an excessive volume of the same, or when the raising of the molds 15 with the material 56 thereon is too sudden, also when any of the molds happens to be displaced in the chuck 14, to prevent breakage of molds or of parts of the machine.

The adjusting screws 65 are provided for varying the length of the stroke of each of the profiles 58, during which it moves lengthwise the axis thereof in unison with the mold 15 on the chuck 14, for shaping articles having different thicknesses. By varying the position of the adjusting screws 65, the thickness of the articles, which are shaped on the molds will vary. This adjustment may also be employed to counteract or to augment the result of the adjustments in the positions of said profiles 58 and said trimmers 66, as is hereinbefore described.

The carriers 16 have each therein a cut-out 97 near the end thereof, for allowing the upper ends of the pitmen 19 to pass therethrough for actuating the members 59.

The outlines of the cams 45 are designed for properly timing the action of the pawls 51—52, to correspond to the time of the action of the chucks 14 and pitmen 19.

Each carrier 16 is shown as employed at one time to carry two or more molds for two or more jiggers in the machine placed in a direction transversely to the line of travel of said carrier 16; the number of jiggers in the machine may be increased also in the direction of the line of travel of said carrier 16 if desired, and one carrier may be employed at one time to carry the molds for all the jiggers.

The number of jiggers may also be reduced in small machines to one, if desired, and the automatic means for profiling and feeding the molds to the jiggers, which are hereinbefore described, may be employed therein.

Different articles may be formed simultaneously on the various jiggers of the same machine by providing each jigger with the necessary cam, properly adjusted for the article, which is to be formed thereon.

Many other changes may be made in the details of my machine without departing from the main scope of my invention, and parts of my invention may be used without other parts.

My machine may also be employed in analogous arts other than those appertaining to the manufacture of articles from plastic materials.

I do not, therefore, restrict myself to the details as shown and described, but I intend to include also all mechanical equivalents and obvious modifications of the same within the scope of my invention.

I claim as my invention, and desire to secure by Letters Patent:

1. A machine of the class specified including a profile, mold carriers having molds thereon, a track adapted to support and guide a plurality of said carriers, and means for imparting movement to said carriers to bring the molds successively into alinement with the profile.

2. A machine of the class specified including a track adapted to support and guide a plurality of mold carriers, molds supported by said carriers, a profile disposed above said track, vertically reciprocating members adapted to move the molds toward and from the profile, and means for moving the mold carriers along said track.

3. A machine of the class specified including a plurality of mold carriers mounted for horizontal rectilinear movement, means for intermittently moving said carriers in definite spaced relation, and means for varying the extent of said horizontal rectilinear movement.

4. A machine of the class specified including a profile, a plurality of molds, mold carriers adapted to support said molds and means for successively moving said carriers horizontally to bring the molds into alinement with said profile, said moving means being adjustable to move one carrier or a plurality of carriers at each operation.

5. A machine of the class specified including a track, a mold carrier thereon, and a lever pivoted adjacent said track, said lever being operative to move the carrier in one direction only.

6. A machine of the class specified including a track, a mold carrier thereon, a lever pivoted adjacent said track, a pawl adjustably connected to said lever and adapted to engage the carrier, and means for varying the throw of the lever.

7. A machine of the class specified including a track, mold carriers adapted to be placed thereon in series, molds supported by said carriers, a chuck for lifting a mold from each of said carriers successively, means for moving said carriers along the track, and means for releasably engaging each carrier to center the molds above the chuck.

8. A machine of the class specified including a track, mold carriers adapted to be placed thereon in series, molds supported by said carriers, a chuck for lifting a mold from each of said carriers successively, means for moving said carriers along the track, and a spring detent adjacent said track for releasably engaging each carrier to center the mold above the chuck.

9. A machine of the class specified including a mold support, a chuck mounted for vertical reciprocation and adapted to move a mold to and from its operative position, a lever for controlling the vertical movements of said chuck, and means adjustable while in operation for varying the pivot point of said lever.

10. A machine of the class specified including a mold support, a chuck mounted for vertical reciprocation and adapted to move a mold to and from its operative position, a lever for controlling the vertical movements of said chuck, a bracket, a pivot block adjustably mounted on said bracket, said lever being pivoted to the pivot block, whereby the throw of the lever may be varied without varying the lower limit of movement of the lever.

11. A machine of the class specified including a mold support, a chuck mounted for vertical reciprocation and adapted to move a mold to and from its operative position, means for reciprocating said chuck, and means for varying such reciprocation while in operation and while the driving connection subsists.

12. A machine of the class specified including a chuck, a mold, a movably mounted profile, a spring normally holding said profile at the lower limit of its movement, means for moving the mold into cooperative relationship with the profile, and means acting on the profile independently of the mold for lifting the profile.

13. A machine of the class specified including a mold, a movably mounted profile, an adjustable abutment associated with said profile, and means for engaging and raising the mold into operative position with respect to the profile and thereafter engaging the adjustable abutment to raise the profile.

14. A machine of the class specified including a chuck, a mold, a movably mounted profile, a pitman for raising the chuck to bring the mold into operative position with respect to the profile, and an extension on said pitman for raising the profile.

15. A machine of the class specified including a profile, a plurality of mold carriers adapted to be arranged in abutting relation, and means adapted to be intermittently projected between said carriers for moving the profile.

16. A machine of the class specified including a track along which molds are adapted to be fed, a movably mounted profile above the track, means for raising the molds into cooperative relationship with the profile, and normally disconnected means for raising said profile, said last-named means being adapted to be connected after the mold is brought into operative relation to the profile.

17. A machine of the class specified, including a mold, a profile, a trimmer, means for movably mounting certain of said elements, and means for imparting a movement of translation to said movably mounted elements whereby said mold and profile are first brought into cooperative relationship and then the mold and trimmer are brought into cooperative relationship.

18. A machine of the class specified, including a chuck, a mold, a movably mounted profile, a trimmer, a reciprocable pitman for raising the chuck to bring the mold into operative position with respect to the profile, further movement of the pitman raising the profile and bringing the mold into operative position with respect to the trimmer.

19. A machine of the class specified, including a track, a mold carrier on said track, molds on said carrier, said molds being accessible through the bottom of the carrier means for moving said carrier along the track, and a plurality of chucks for cooperation with the molds in said carrier.

20. A machine of the class specified, including a track, mold carriers adapted to be mounted on said track, molds on said carriers, the molds being accessible through the bottom of the carriers, a plurality of chucks adapted to reciprocate through said carriers to intermittently elevate the molds clear of the carriers, and automatic means for intermittently moving the carriers along said track.

21. A machine of the class specified including a multiple mold carrier, a plurality of reciprocable chucks for operating the molds, and independently adjustable means for reciprocating the chucks.

22. A machine of the class specified including a mold carrier, a track on which said carrier is adapted to travel, a reciprocable chuck for elevating a mold to operative position, cylindrical projections on said carrier, and pawls for engaging said projections for moving said carrier along the track.

23. In a machine of the class specified, a multiple mold carrier comprising a tray containing a plurality of seats in which molds are adapted to be received and supported, the molds being accessible through the bottom of the carrier, and trunnions extending laterally from said tray.

24. In a machine of the class specified, one or more reciprocating members, to support molds, one or more levers to actuate said members, to move said molds into and out of operative position, a pivot slidably and pivotally connected to each of said levers, for varying the stroke of said members, and a means for adjusting the position of said pivots with relation to said levers.

25. In a machine of the class specified, one or more reciprocating members, to support molds, one or more levers to reciprocate said members, to move said molds into and out of operative position, a floating pivot block, slidably connected to each of said levers, for varying the stroke of said members, and a means for adjusting the position of said blocks on said levers while said members are in operation.

26. In a machine of the class specified, a frame, a pair of tracks thereon, multiple carriers on said tracks, said carriers being adapted to support molds, arranged in a line transversely to said tracks, multiple profiles, multiple reciprocating members for simultaneously raising said molds from said carriers in succession, to bring them into and out of coaction with said profiles, and a means for moving said carriers on said tracks into operative position.

27. In a machine of the class specified, multiple carriers, for supporting molds, one or more profiles, one or more reciprocating members, for simultaneously raising said molds from said carriers in succession, to bring them into and out of coaction with said profiles, and a pawl, for intermittently moving said carriers, to bring them into operative position.

28. In a machine of the class specified, multiple carriers, for supporting molds, one or more profiles, one or more reciprocating members, for simultaneously raising the molds from said carriers in succession, to bring them into and out of coaction with said profiles, an oscillating arm and a pawl, pivotally connected thereto, for intermittently moving said carriers into operative position.

29. In a machine of the class specified, multiple carriers, for supporting molds, one or more profiles, one or more reciprocating members, for simultaneously raising the molds from said carriers in succession, to bring them into and out of coaction with said profiles, an oscillating arm and an extensible pawl connected thereto, for intermittently moving said carriers into operative position, said extensible pawl being adapted to act on carriers of different sizes.

30. In a machine of the class specified, multiple carriers, for supporting molds, one or more profiles, one or more reciprocating members, for raising the molds from said carriers in succession, to bring them into and out of coaction with said profiles, projections on said carriers, and pawls, to engage said projections, for intermittently moving said carriers, to bring them into operative position.

31. In a machine of the class specified, multiple carriers, for supporting molds, one or more profiles, one or more reciprocating members, for raising the molds, from said carriers in succession, to bring them into and out of coaction with said profiles, an oscillating arm and a pawl, pivotally connected thereto, for intermittently moving said carriers into operative position, and a means for varying the length of said arm, for moving carriers of different sizes.

32. In a machine of the class specified, a frame, one or more profiles, multiple carriers, for supporting molds, one or more reciprocating members, for raising the molds from said carriers in succession, to bring them into and out of coaction with said profiles, and an oscillating arm, pivotally connected to said frame, for intermittently moving said carriers into operative position.

33. In a machine of the class specified, a frame, one or more profiles, multiple carriers, for supporting molds, one or more reciprocating members, for raising the molds from said carriers in succession, to bring them into and out of coaction with said profiles, one or more oscillating arms, pivotally connected to said frame, for intermittently moving said carriers into operative position, and a means for rocking said arms.

34. In a machine of the class specified, a frame, one or more profiles, multiple carriers, for supporting molds, one or more reciprocating members, for raising said molds from said carriers in succession, to bring them into and out of coaction with said profiles, one or more oscillating arms, pivotally connected to said frame, for intermittently moving said carriers into operative position, and one or more rotary cams for rocking said arms.

35. In a machine of the class specified, one or more profiles, multiple carriers, arranged to move in a straight line, to carry molds, one or more reciprocating members, for successively raising said molds from said carriers, to bring them into and out of coaction with said profiles, one or more rotary cams, for intermittently moving said carriers into operative position, and a means for adjusting the phase of action of said cams.

36. In a machine of the class specified, one or more profiles, multiple carriers, arranged to move in a straight line, to carry molds, one or more reciprocating members, for successively raising said molds from said carriers, to bring them into and out of coaction with said profiles, one or more rotary cams, for intermittently moving said carriers into operative position, a shaft for mounting said cams thereon, and a means for adjusting the position of said cams on said shaft, thereby adjusting the phase of action of said cams.

37. In a machine of the class specified, a frame, one or more profiles, movable in a straight line, mounted thereon, means for normally supporting said profiles in position, one or more reciprocating members, each to carry a mold with material thereon, a means for actuating said members, to move said molds with the material thereon into and out of coaction with said profiles, and a means for moving said profiles in unison with said members through part of the stroke of the latter.

38. In a machine of the class specified, a frame, one or more profiles, movable in a straight line, mounted thereon, means for normally supporting said profiles in position, one or more reciprocating members, each to carry a mold with material thereon, a means for actuating said members, to move said molds with the material thereon into and out of coaction with said profiles, and an automatic means, for moving said profiles in unison with said members through part of the stroke of the latter.

39. In a machine of the class specified, a frame, a support for a mold with material thereon, a trimmer, which is stationary with relation to said frame, a profile, which is movably mounted on said frame, a means for producing relative motion between said support and said profile, for shaping the material on said mold, and a means for moving said support in unison with said profile after the operation of profiling is completed, to bring said mold with the rim of material thereon under the action of said trimmer.

40. In a machine of the class specified, a frame, one or more profiles, movable in a straight line, mounted thereon, means for normally supporting said profiles in position, one or more reciprocating members, each to carry a mold with material thereon, a means for actuating said members, to move said molds with the material thereon into and out of coaction with said profiles, a means for moving said profiles in unison with said members through part of the stroke of the latter, and a means for adjusting the length of the stroke of said profiles.

41. In a machine of the class specified, a frame, a support for a mold, a means for reciprocating the same, a profile, a holder therefor, said holder being movable on said frame, a means for moving said holder in unison with said support through part of the stroke of the latter, a means for producing relative motion between said support and said holder through part of the stroke of the former, a stop, for limiting the motion of said holder on said frame in the direction of said support, and a means for adjustably connecting said holder to said stop, for varying and adjusting the nearest position of said holder to said support.

42. In a machine for use in the manufacture of articles from plastic materials, one or more reciprocating members, each to support a mold, one or more pitmen connected to said reciprocating members, to reciprocate the latter in unison therewith, to move said molds into and out of operative position, and a means for adjusting and limiting the lowest position of said pitmen without interfering with the highest position thereof.

43. In a machine for use in the manufacture of articles from plastic materials, one or more reciprocating members, each to support a mold, a frame, one or more pitmen operatively connected to said reciprocating members, to reciprocate the latter in unison therewith, to move said molds into and out of operative position, one or more levers, to reciprocate said pitmen and one or more screws adjustably secured to said frame under said pitmen, for adjusting the lowest position thereof.

WILLIAM J. MILLER.

DISCLAIMER 1,757,132.—*William J. Miller*, Swissvale, Pa. MACHINE FOR USE IN THE MANUFACTURE OF POTTERY WARE. Patent dated May 6, 1930. Disclaimer filed May 20, 1930, by the patentee.

Hereby enters this disclaimer to the paragraph set forth on page 4 of the patent as issued, between lines 84 and 89, and which read as follows:

"My machine may also be employed in analogous arts other than those appertaining to the manufacture of articles from plastic materials."

[*Official Gazette June 10, 1930.*]